Figure 1:
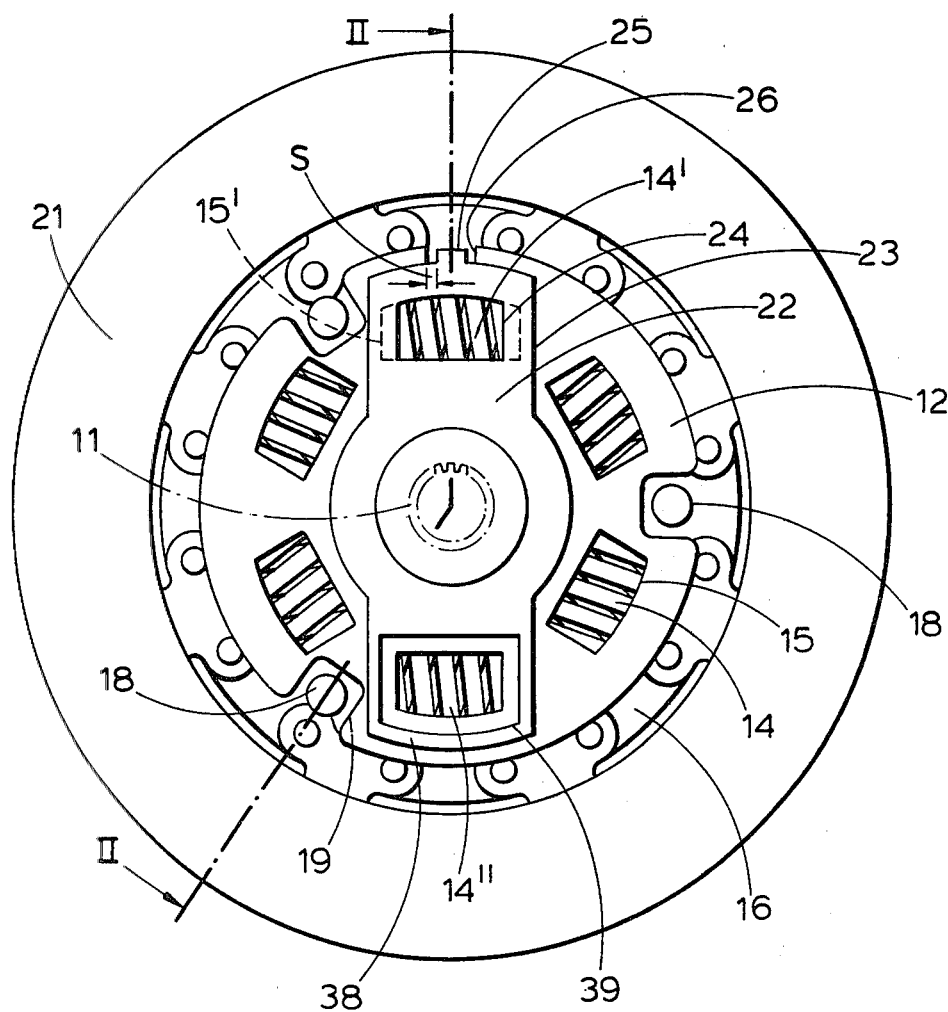

United States Patent [19]

Stanley

[11] 4,354,586

[45] Oct. 19, 1982

[54] FRICTION CLUTCH DRIVEN PLATE

[75] Inventor: Michael G. Stanley, Banbury, England

[73] Assignee: Automotive Products Limited, Leamington Spa, England

[21] Appl. No.: 156,802

[22] Filed: Jun. 5, 1980

[30] Foreign Application Priority Data

Jun. 7, 1979 [GB] United Kingdom ............... 7919794

[51] Int. Cl.$^3$ .............................................. F16D 3/66
[52] U.S. Cl. .............................................. 192/106.2
[58] Field of Search ............... 192/106.2, 106.1, 70.18, 192/70.17, 70.16; 64/27 C, 27 S

[56] References Cited

U.S. PATENT DOCUMENTS

| 2,158,244 | 5/1939 | Mistretta et al. | 192/106.2 |
| 3,931,876 | 1/1976 | Beeskow et al. | 192/106.2 |
| 3,938,635 | 2/1976 | Davies et al. | 192/106.2 |
| 3,982,617 | 9/1976 | Worner | 192/106.2 |
| 4,018,320 | 4/1977 | Schrape et al. | 64/27 C |
| 4,036,341 | 7/1977 | Beeskow et al. | 192/106.2 |
| 4,044,874 | 8/1977 | Worner | 192/106.2 |
| 4,222,476 | 9/1980 | LeBrise | 192/106.2 |

Primary Examiner—George H. Krizmanich
Attorney, Agent, or Firm—Kemon & Estabrook

[57] ABSTRACT

This invention relates to friction clutch driven plates in which the friction facings are carried on a friction facing carrier rotatably mounted on a hub. Relative rotational movement between the hub and the carrier is resisted by springs and a friction damper plate. The friction damper plate is sandwiched between the hub flange and a facing carrier plate and is in frictional engagement with the carrier plate. The damper plate has a radial arm with an aperture therein that snugly accommodates a spring and has an axially extending lug, located at the outer periphery of the arm, loosely engages a slot in the hub flange so that there is no friction damping for the initial movement of the carrier relative to the hub, until the lug abuts the end of the slot.

4 Claims, 2 Drawing Figures

FRICTION CLUTCH DRIVEN PLATE

This invention relates to friction clutch driven plates and in particular to automobile friction clutch driven plates.

Friction clutch driven plates for motor vehicles typically comprise a friction facing carrier mounted on and capable of limited angular movement about a flanged hub, springs acting between the carrier and the hub flange to restrain said angular movement, and a friction damping means rendered effective by angular movement of an annular control plate relative to the carrier, the control plate being located axially between the hub flange and the facing carrier.

Such a construction of driven plates is shown in British Patent Specification No. 1,461,977, and in British Patent Specification No. 1,462,014.

It is the object of this invention to provide an improved control plate which is particularly suitable for clutch plates having a large number of torsion damping springs, i.e. four to six springs.

Accordingly, there is provided a friction clutch driven plate having a hub with a circumferential flange thereon, a friction facing carrier mounted on the hub and capable of limited angular movement about the hub, springs acting between the hub flanges and the carrier to restrain said angular movement, and a friction damping means rendered effective by angular movement of an annular control plate relative to the carrier, the control plate being located axially between the hub flange and the facing carrier and comprising a substantially radial arm with an aperture therein snugly accommodating one of said springs, and having at its radially outer periphery an axially directed lug that engages in a circumferentially extending slot in the outer peripheral edge of the flange, the lug having circumferential clearance in the slot to allow for an initial sector of said angular movement of the carrier relative to the hub before the friction damper begins to operate.

An advantage of this construction is that the control plate engages with the hub flange in a symmetrical manner in that the axial lug that engages the hub is located on a radius of the rotational axis of the control plate, and there are no forces tending to off centre the control plate.

Further, because the control plate is a snug fit about one of the main torsion damping springs, it will always be returned to a zero position with respect to the hub flange.

Figure 2:
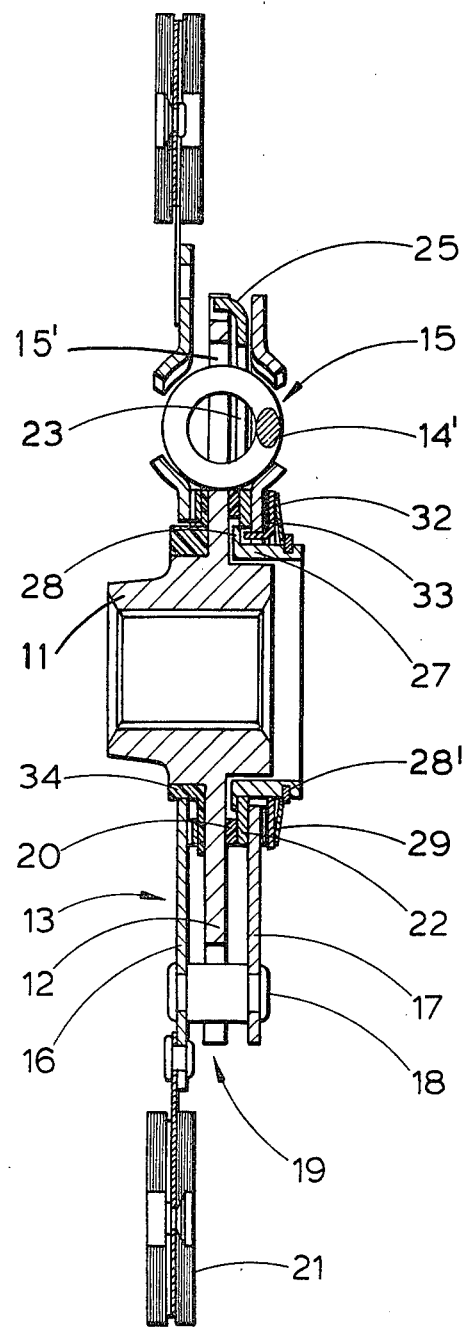

The invention will be described by way of example and with reference to the following drawings in which:

FIG. 1 shows an elevation of a friction clutch driven plate with the retainer plate removed to expose the control plate; and FIG. 2 is a section on the line II—II of FIG. 1.

With reference to the accompanying drawings, the illustrated friction clutch driven plate comprises a hub 11 having an annular flange 12, and a friction facing carrier 13 mounted on the hub 11 and capable of limited angular movement relative to the hub. A set of damping springs 14 are housed in aligned apertures 15 in the facing carrier 13 and hub flange 12 and operate so as to restrain the angular movement.

The facing carrier 13 comprises an annular carrier plate 16 and an annular retainer plate 17. The two plates 16 and 17 are disposed one on each of the flange 12 and are rigidly secured together by stop pins 18 which pass through co-operating apertures 19 in the outer margin of the flange 12. The stop pins limit the angular movement of the carrier 13 around the hub 11 by abutment against the radial ends of the apertures 19.

A pair of opposed annular friction facings 21 are mounted on the outer periphery of the carrier plate 16 for engagement with friction surfaces on a vehicle flywheel and pressure plate (not shown).

Between the retainer plate 17 and the hub flange 12 is located a friction damping control plate 22 which is in frictional engagement with the retainer plate 17 and is spaced from the hub flange 12 by a washer 20 of low friction material e.g. nylon 66. The control plate 22 has a substantially radial arm 23 with an aperture 24 therein, snugly accommodating one of the torsion damping springs 14' and having on its radially outer edge an axially (axially with respect to the axis of rotation of the clutch driven plate) directed lug 25 that engages in a circumferentially extended slot 26 in the outer peripheral edge of the flange 12. The lug 25 has circumferential clearance in the slot 26 so as to provide for an initial sector of angular movement of the carrier 13 about the hub 11 before the friction damping begins to operate. This will be explained in detail later in the specification.

A second substantially radial arm 38 on the control plate 22 is positioned diametrally opposite and provides a counter-balance for the other arm 23. An oversize aperture 39 is provided in the second arm 38 so that the arm can accommodate a damping spring 14" within the aperture and avoid contact with said spring 14".

The control plate 22 is carried on a central axially extending cylindrical ring 27 having radial lips 28 one at each end and which is capable of rotating freely around the hub 11. The lip 28 adjacent the flange 12 provides an abutment for the control plate 22 which is pulled against the retainer plate 17 by a belleville spring washer 29 acting between the lip 28' formed at the other end of the ring 27 by a circlip, and the retainer plate 17, via a friction washer 32 and wear ring 33.

The carrier plate 16 is supported for angular movement about the hub, on a flanged nylon bush 34, the cylindrical portion of which projects through the centre of the carrier plate 16, and the radial portion of which is sandwiched between the carrier plate 16 and the hub flange 12.

Angular movement of the control plate 22 operates to render effective the friction damping device. The torsion damping spring 14' has a snug fit in its aperture 24 in the control plate 22, and in its respective aligned apertures 15 in the facing carrier 13, but has circumferential clearance in the respective aperture 15' in the hub flange 12 (shown in dotted lines in FIG. 1). Thus if the hub 11 is held stationary and the friction facing carrier 13 rotated anti-clockwise then the following stages occur:

(i) The control plate 22 is held fast with the carrier 13 by the spring 14' and rotates with the facing carrier 13 relative to the hub. There is a small amount of friction damping at this stage provided by the bush 34, and washer 22. Further one of the springs 14" is a very light spring and is arranged to operate immediately to provide some torsional resilience from the beginning of the angular movement. This stage continues until the lug 25 takes up the clearance 'S' and abuts the edge of the aperture 26. At this point the spring 14' has been moved to abut against the end of the aperture 15' in the hub.

(ii) Further anti-clockwise movement of the facing carrier causes the control plate 22 to be held by the hub flange 12 whilst the facing carrier 13 now moves relative to the control plate 22. This further relative movement is resisted by the friction damping set up by the moving contact between the control plate 22 and the retainer plate 17 and by the gradual compression of the other springs 14. The springs 14 can either work together or can operate in a series of stages, as is well known. This second stage of movement continues until the rivets 18 abut the edges of the co-operating apertures 19.

If the friction carrier is now returned to its original position relative to the hub 11, the reverse movement takes place. The light spring 14" serves to zero the facing carrier 13 with respect to the hub 11, and because the control plate 22 is connected to the facing carrier 13 through the spring 14' this also serves to zero the control plate 22 with respect to the hub 11.

Whilst it is convenient for the spring 14' to abut the radial end of its hub aperture 15' when the lug 25 takes up the clearance 'S', it is not necessary to the working of the plate. The spring 14' could abut the end of its hub aperture before the lug 25 has taken up its clearance. In this case the friction damping will still not operate until the clearance 'S' has been taken up.

I claim:

1. A friction clutch driven plate having;
   a hub with a circumferential flange thereon;
   a circumferentially extending slot defined in the outer peripheral edge of the flange;
   a friction facing carrier mounted on the hub and capable of limited angular movement about the hub;
   springs acting between the flange and the carrier to restrain said angular movement;
   and friction damping means which includes;
   a control plate located axially between the flange and the facing carrier and which is capable of angular movement relative to the carrier to render said friction damping means effective, said control plate having a substantially radial outwardly projecting arm with an aperture defined therein which snugly accommodates one of said springs, and said arm has at its radially outer peripheral edge an axially directed lug that engages said slot and has circumferential clearance therein to allow for an initial sector of angular movement of the carrier relative to the hub before the damping means is rendered effective.

2. A driven plate as claimed in claim 1, wherein the control plate has a second substantially radial arm diametrally opposite the other arm, said second arm providing only a counter-balance for said other arm.

3. A driven plate as claimed in claim 2 wherein there is an aperture defined in the second arm, said aperture accommodating a second of said springs, and having circumferential clearance around said second spring.

4. A driven plate as claimed in any one of claims 1, 2 or 3, wherein said one spring is snugly accommodated in the control plate aperture and has circumferential clearance in its respective hub flange aperture, said circumferential clearance being equal to the circumferential clearance between said lug and its respective slot.

* * * * *